(12) United States Patent
Pierson

(10) Patent No.: US 8,931,247 B2
(45) Date of Patent: Jan. 13, 2015

(54) REEL FOR AN AGRICULTURAL HARVESTING HEAD

(71) Applicant: Deere & Company, Moline, IL (US)

(72) Inventor: Joshua Pierson, Davenport, IA (US)

(73) Assignee: Deere & Company, Moline, IL (US)

( * ) Notice: Subject to any disclaimer, the term of this patent is extended or adjusted under 35 U.S.C. 154(b) by 259 days.

(21) Appl. No.: 13/664,097

(22) Filed: Oct. 30, 2012

(65) Prior Publication Data

US 2014/0116019 A1 May 1, 2014

(51) Int. Cl.
*A01D 57/02* (2006.01)
*A01D 57/03* (2006.01)

(52) U.S. Cl.
CPC ............... *A01D 57/03* (2013.01); *A01D 57/02* (2013.01)
USPC ............................................. 56/226

(58) Field of Classification Search
USPC ........... 56/14.4, 220, 221, 226, 219, 227, 364
See application file for complete search history.

(56) References Cited

U.S. PATENT DOCUMENTS

| 3,555,796 A | 1/1971 | Baumeister |
| 3,667,198 A | 6/1972 | Gibson |
| 4,156,340 A | 5/1979 | Colgan et al. |
| 4,835,953 A | 6/1989 | Naaktgeboran et al. |

FOREIGN PATENT DOCUMENTS

| RU | 2400962 C2 | 10/2010 |
| SU | 1207424 A | 1/1986 |
| SU | 1750476 A1 | 7/1992 |

OTHER PUBLICATIONS

Eurasian Search Report issued in counterpart application No. 201301056, dated Apr. 30, 2014 (2 pages).

*Primary Examiner* — Thomas B Will
*Assistant Examiner* — Mai Nguyen

(57) ABSTRACT

A reel for an agricultural harvesting head has a rotating wheel that is pivotally coupled to a plurality of bat extension links and each of the bat extension links is pivotally coupled to a corresponding bat.

12 Claims, 3 Drawing Sheets

REEL FOR AN AGRICULTURAL HARVESTING HEAD

FIELD

The invention relates to reels for agricultural harvesting heads.

BACKGROUND

Reels are provided on agricultural harvesting heads to sweep the tops of crop plants onto conveyors on the harvesting heads. Controlling and optimizing the movement of the crop-engaging elements of the reels is important in order to gather as much as possible of the crop plants.

It is an object of this invention to provide a reel having an improved path for the crop engaging elements.

SUMMARY

In accordance with a first aspect of the invention, a reel for engaging and guiding crop plants into an agricultural harvesting head is provided, the reel comprising a reel mount configured to be mounted on an agricultural harvester, a wheel supported for rotation on the reel mount about a first rotational axis with respect to reel mount, an eccentric wheel supported for rotation on the reel mount about a second rotational axis, wherein said second rotational axis is generally parallel to and spaced away from the first rotational axis, and wherein the eccentric wheel comprises a hub and a plurality of arms that are pivotally coupled to the hub, a plurality of bat extension links distributed about the periphery of the wheel, wherein said plurality of bat extension links are pivotally coupled to the wheel at a plurality of corresponding first pivot points to pivot with respect to the wheel about axes that are generally parallel to the first rotational axis, wherein said first pivot points are disposed equidistant from the first rotational axis, wherein said first pivot points are spaced equidistantly apart from each other, and further wherein each of said plurality of bat extension links is pivotally coupled to a corresponding one of said plurality of arms at a second pivot point on said each of said plurality of bat extension links that is disposed away from said first pivot point on said each of said plurality of bat extension links, a plurality of bats, wherein each of said plurality of bats is pivotally coupled to a corresponding one of said plurality of bat extension links at a third pivot point on said bat extension link that is disposed away from the second pivot point and the first pivot point, such that each of the plurality of bats pivots with respect to the bat extension link, a plurality of bat cranks, wherein each of said plurality of bat cranks is fixed to a corresponding one of said plurality of bats to pivot with said one of said plurality of bats with respect to the bat extension link to which said one of said plurality of bats is pivotally mounted, and a plurality of bat orientation members, wherein each of said plurality of bat orientation members is pivotally coupled to a corresponding one of said plurality of bat cranks at a fourth pivot point on the bat crank that is spaced away from the bat to which said one of said plurality of bat cranks is fixed, and wherein each of said plurality of bat orientation members is also pivotally coupled to said wheel.

Each of the plurality of bat extension links may be coupled to the wheel at the first point that is between the second pivot point and the third pivot point.

The plurality of bat extension links may pivot with respect to the wheel during one full revolution of the wheel such that each of the plurality of bats is closer to the first rotational axis than the first pivot point at a first rotational position of wheel and each of the plurality of bats is farther from the first rotational axis than the first pivot point at a second rotational position of wheel.

Each of the plurality of bat orientation members may be coupled to the wheel at a fifth pivot point that is closer to the first rotational axis than the fourth pivot point over an entire revolution of the wheel.

The second rotational axis may be disposed behind the first rotational axis when the reel is in a harvesting position.

The second rotational axis may be disposed above the first rotational axis when the reel is in a harvesting position.

In accordance with a second aspect of the invention, a reel for engaging and guiding crop plants into an agricultural harvesting head is provided, the reel comprising, a reel mount configured to be mounted on an agricultural harvester a wheel supported for rotation on the reel mount about a first rotational axis with respect to reel mount, an eccentric wheel supported for rotation on the reel mount about a second rotational axis, wherein the eccentric wheel comprises a hub and a plurality of arms that are pivotally coupled to the hub, a plurality of bat extension links, wherein said plurality of bat extension links are pivotally coupled to the wheel at a plurality of corresponding first pivot points to pivot with respect to the wheel, and further wherein each of said plurality of bat extension links is pivotally coupled to a corresponding one of said plurality of arms at a second pivot point on said each of said plurality of bat extension links, a plurality of bats, wherein each of said plurality of bats is pivotally coupled to a corresponding one of said plurality of bat extension links at a third pivot point on said bat extension link, such that each of the plurality of bats is pivotable with respect to the bat extension link, a plurality of bat cranks, wherein each of said plurality of bat cranks is fixed to a corresponding one of said plurality of bats to pivot with said one of said plurality of bats, and a plurality of bat orientation members, wherein each of said plurality of bat orientation members is pivotally coupled to a corresponding one of said plurality of bat cranks at a fourth pivot point on the bat crank, and wherein each of said plurality of bat orientation members is also pivotally coupled to said wheel.

The plurality of bat extension links may be coupled to the wheel at the first point that is between the second pivot point and the third pivot point.

The plurality of bat extension links may pivot with respect to the wheel such that each of the plurality of bats is closer to the first rotational axis than the first pivot point at a first rotational position of wheel and each of the plurality of bats is farther from the first rotational axis than the first pivot point at a second rotational position of wheel.

Each of the plurality of bat orientation members may be coupled to the wheel at a fifth pivot point that is closer to the first rotational axis than the fourth pivot point over an entire revolution of the wheel.

The second rotational axis may be disposed behind the first rotational axis when the reel is in a harvesting position.

The second rotational axis may be disposed above the first rotational axis when the reel is in a harvesting position.

DETAILED DESCRIPTION

Figure 1:
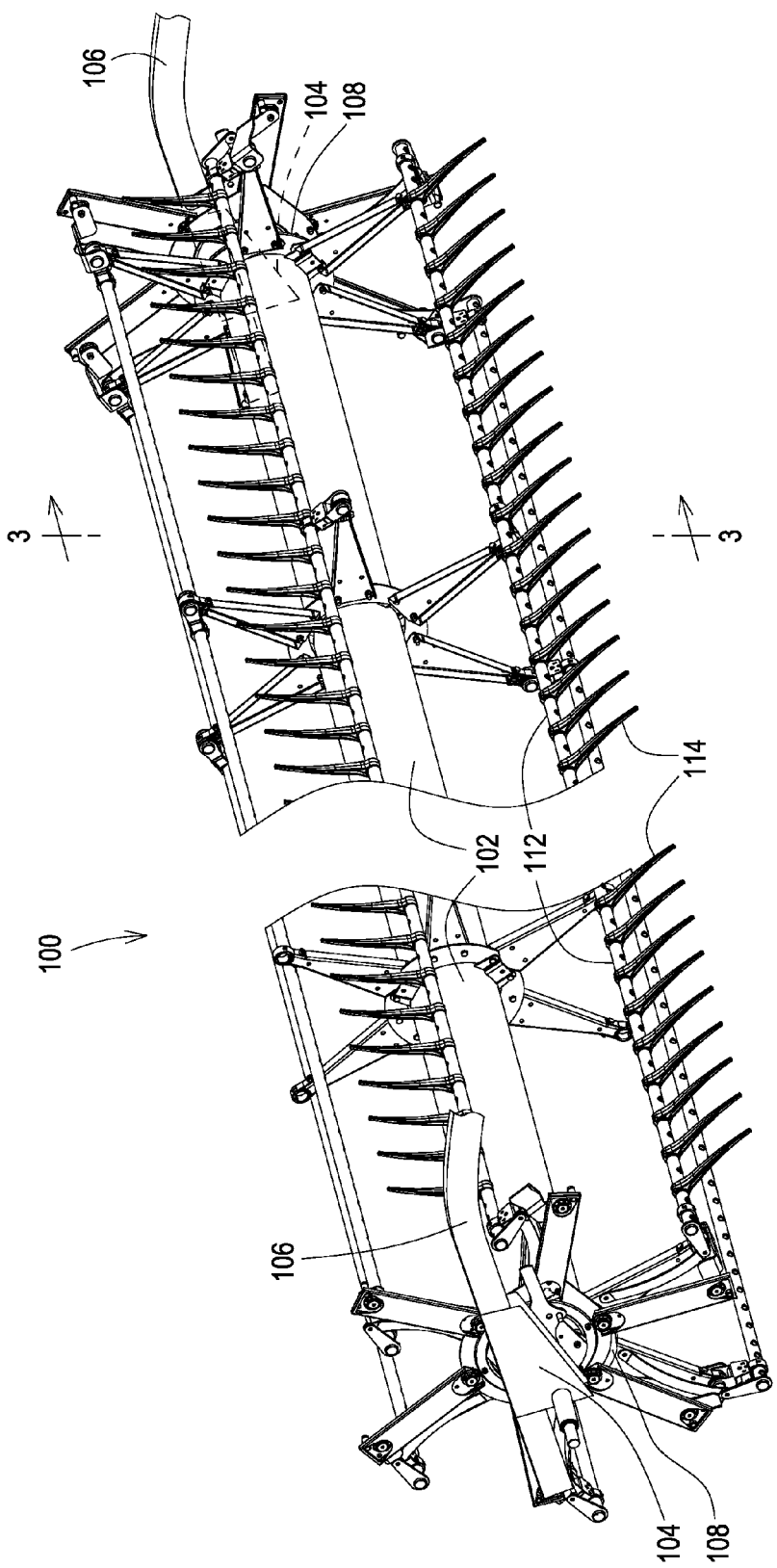
FIG. 1 is a fragmentary perspective view of a reel for an agricultural harvesting head.

Referring to FIG. 1, a reel 100 for an agricultural harvesting head has an elongate central shaft 102 that is supported for rotation on two reel mounts 104. Reel mounts 104 are supported for sliding movement on reel arms 106. Reel arms 106 are supported on the frame of an agricultural harvesting head (not shown) such that the reel extends outward in front of the harvesting head to engage the crop plants being harvested.

Wheels 108 are mounted to opposing ends of the central shaft 102 to rotate with the central shaft 102 when the central shaft 102 is driven in rotation. Bats 112 are spaced apart around the periphery of the central shaft 102 and are supported on the wheels 108 at opposing ends of each bat. The bats translate about the central shaft 102 in a generally circular, elliptical, or oval path as the central shaft 102 rotates.

A plurality of fingers 114 are evenly spaced apart on each bat 112 along substantially the entire length of each bat 112. A portion of the center section of tube 102 and the bats 112 have been removed but they pattern of evenly spaced finger 114 continues along the entire length of bats 112. These fingers are elongate to gently engage the tops of the crop plants and direct the crop plants to fall rearward onto the agricultural harvesting head. They reduce the chance that the crop plants are deposited on the agricultural harvesting head and do not fall on the ground. Fingers 114 have been removed from all but two of the bats in FIG. 1 to avoid confusion. The missing fingers 114 are spaced identically to the illustrated fingers 114 in FIG. 1 and are fixed to the bats 112 in the positions shown in the cross-sectional view of FIG. 3.

Figure 2:
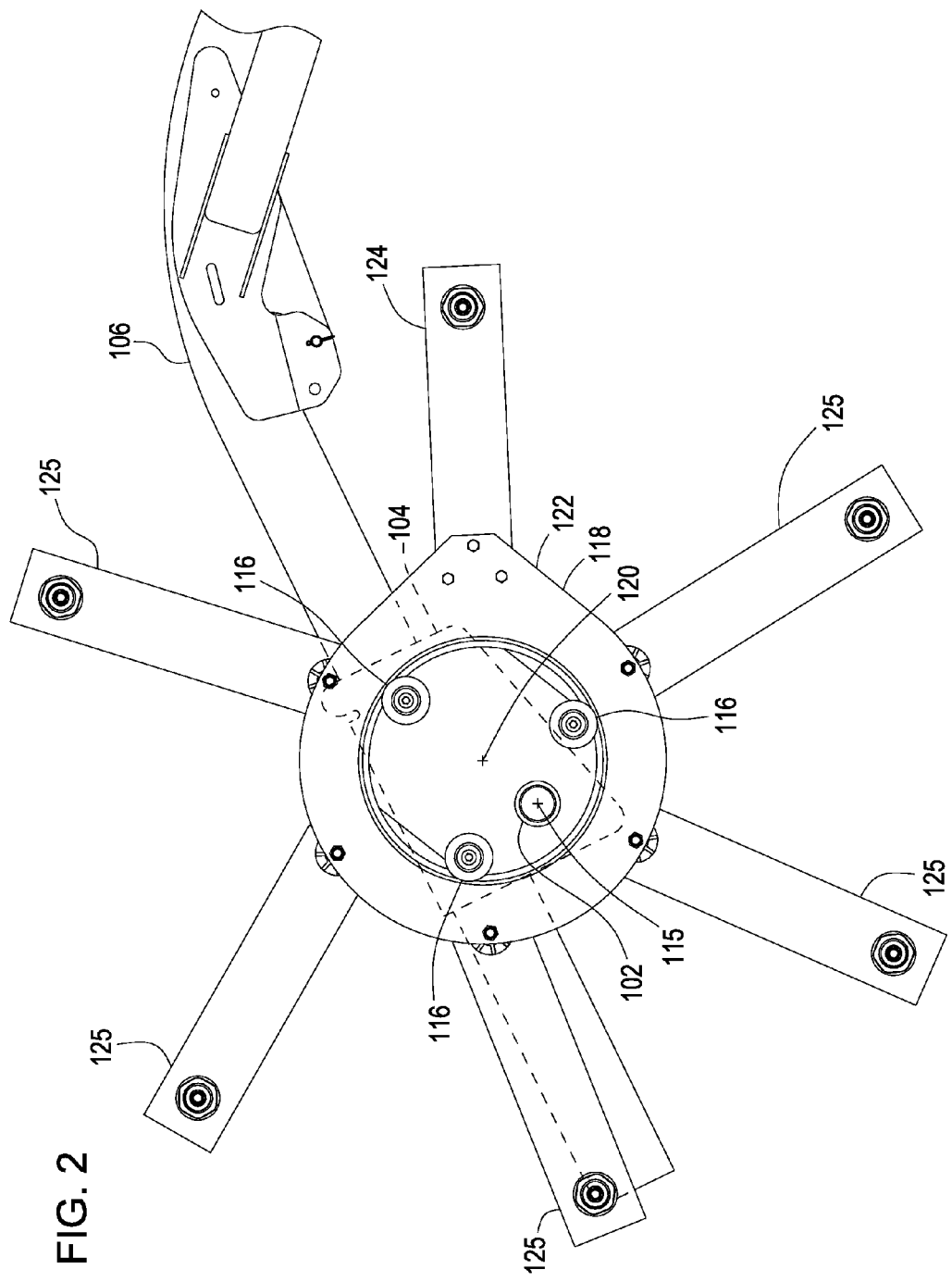
FIG. 2 is a fragmentary cross-sectional view of the reel of FIG. 1 taken at section line 3-3 in FIG. 1 with bats, fingers, wheel and linkages removed for ease of illustration and explanation.
Figure 3:
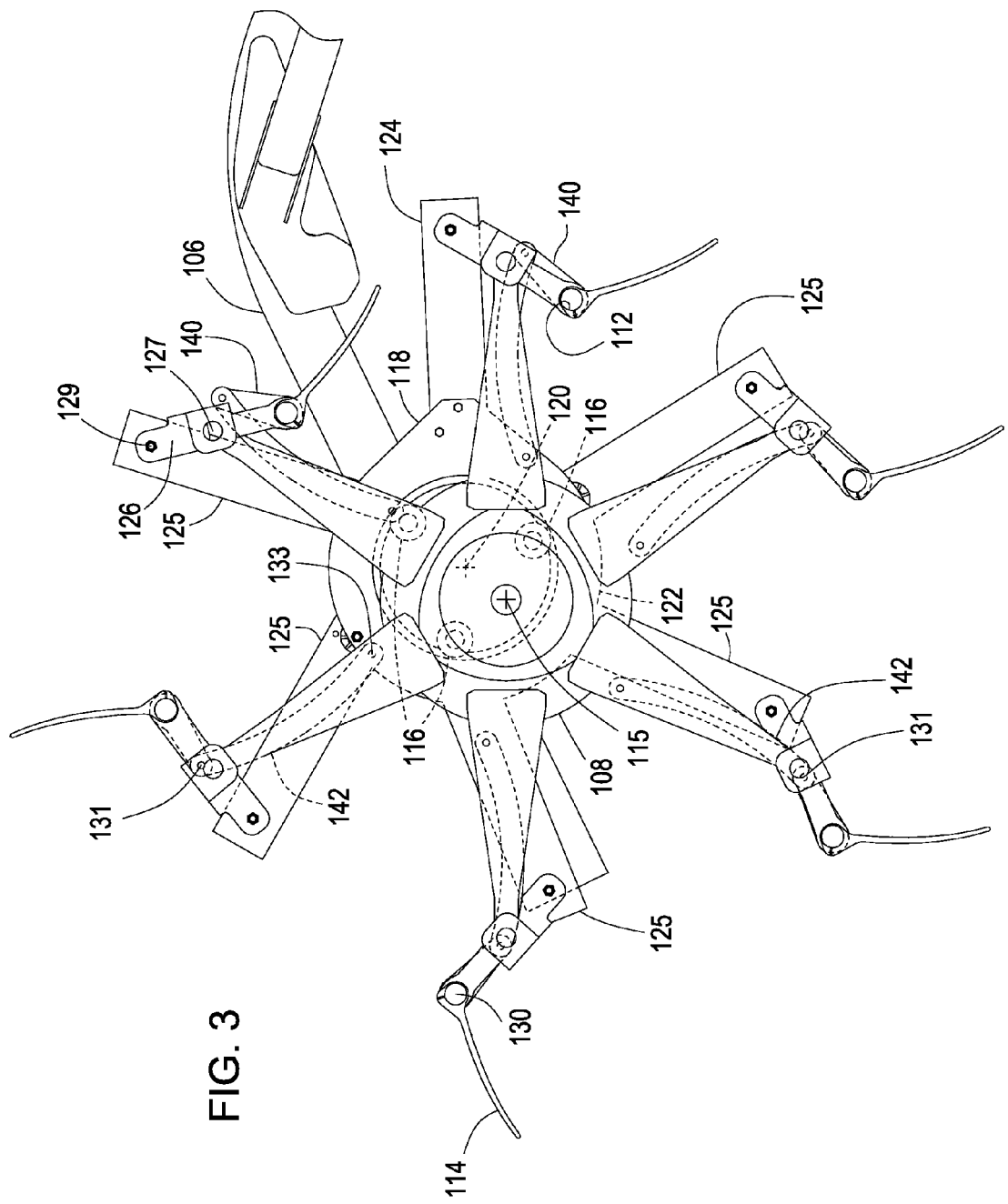
FIG. 3 is a cross-sectional view of the reel of FIG. 1 taken at section line 3-3 in FIG. 1.

FIGS. 2 and 3 illustrate the particular arrangement of the wheels 108 at each end of the reel 100 and how they are constructed. The reel is shown in its operating position as it would be disposed when traveling through the field harvesting crop. The direction of travel of the reel in FIGS. 2 and 3 is to the left.

Only the right end of the reel is shown in this document. The left end is constructed identical to the right end but in mirror image form. For ease of explanation, we will only describe the right end. It should be understood, however, that the arrangement of wheels, links, bats, fingers and mount at the other end of the reel is the same.

FIG. 2 shows reel arm 106 with wheel 108, fingers 114 and bats 112 removed for ease of illustration. Reel mount 104 is slidably supported on reel arm 106. Reel mount 104 can be positioned along the reel arm 106 to any of several possible positions.

Reel mount 104 supports central shaft 102 for rotation about a first rotational axis 115. Reel mount 104 has three bearings 116 that support an eccentric wheel 118 for rotation about a second rotational axis 120 that is offset from the first rotational axis 114. Second rotational axis 120 is disposed behind (e.g. the second rotational axis 120 trails the first rotational axis 115 when the reel 100 is translated to the right through the field harvesting crop) and above the first rotational axis 1115.

Eccentric wheel 118 consists of a hub 122 from which an arm 124 extends. Arm 124 is fixed to hub 122 to move as single member with hub 122. This arm 124 is provided to drive the eccentric wheel 118 in synchrony with wheel 108. Five other arms 125 are pivotally coupled to hub 122 to rotate together with hub 122 and pivot back and forth with respect to hub 122 as the eccentric wheel 118 rotates on bearings 116.

In FIG. 3, the wheel 108, bats 112, and fingers 114 have been illustrated as well as the various linkages that join these elements and the eccentric wheel 118 together.

A plurality of bat extension links 126 are pivotally coupled to the periphery of wheel 108 at pivot points 127 that are equidistant from the first rotational axis 115 and are equally spaced apart about the periphery of wheel 108. Each of the plurality of bat extensions 126 is pivotally coupled to one of arms 124 and 125 near the outer end of each of arms 124, 125 at a pivot point 129.

Wheel 108 rotates about the first rotational axis 115. Eccentric wheel 118 rotates about second rotational axis 120 offset from first rotational axis 115. The relative movement of these two wheels with respect to each other as they revolve about each of the bat extension links 126 pivots with respect to the arms 124, 125 to which it is pivotally coupled and to wheel 108 to which it is pivotally coupled.

This pivoting of bat extension link 126 with respect to wheel 108 causes a pivot point 130 that is located on each of bat extension links 126 to move inward and outward with respect to the first rotational axis 115 as the wheel 108 and the eccentric wheel 118 rotate about their respective first and second rotational axes.

Each bat 112 is pivotally mounted to a corresponding bat extension link at a pivot point 130. Therefore each bat 112 follows a non-circular path as it rotates about first rotational axis 115. The pivot points 127, 129, 130 are arranged such that pivot point 127 is disposed between pivot points 130 and 129.

Each bat 112 not only rotates about first rotational axis 115, it also pivots with respect to pivot point 130. In order to pivot with respect to pivot point 130, a bat link 140 is fixed to the end of each bat such that the bat link 140 and the bat 112 rotate together about the longitudinal axis of the bat 112 with respect to third pivot point 130.

A bat orientation member 142 is pivotally coupled to bat link 140 at one end of bat orientation member 142 and is pivotally coupled to wheel 108 at the other end of bat orientation member 142 at a pivot point 131. Bat orientation member 142 controls the rotational position of bat link 140 and hence the position of bat 112 with respect to bat extension link 126.

The invention is defined by the claims herein. It is not defined by the description above. The description above is provided to illustrate at least one way in which the invention can be created. There are numerous other ways (some known and some as yet unknown) in which the invention can be embodied and still fall within the scope of the claims.

I claim:

1. A reel (100) for engaging and guiding crop plants into an agricultural harvesting head, the reel (100) comprising:
   a reel mount (106) configured to be mounted on an agricultural harvester;
   a wheel (108) supported for rotation on the reel mount (104) about a first rotational axis (115) with respect to reel mount (104);
   an eccentric wheel (118) supported for rotation on the reel mount (104) about a second rotational axis (120), wherein said second rotational axis (120) is generally parallel to and spaced away from the first rotational axis (115), and wherein the eccentric wheel comprises a hub (122) and a plurality of arms (125) that are pivotally coupled to the hub (126);
   a plurality of bat extension links (126) distributed about the periphery of the wheel (108), wherein said plurality of bat extension links (126) are pivotally coupled to the wheel (108) at a plurality of corresponding first pivot points (127) to pivot with respect to the wheel (108) about axes that are generally parallel to the first rotational axis (115), wherein said first pivot points (127) are disposed equidistant from the first rotational axis (115), wherein said first pivot points (127) are spaced equidistantly apart from each other, and further wherein each of said plurality of bat extension links (126) is pivotally coupled to a corresponding one of said plurality of arms (125) at a second pivot point (129) on said each of said plurality of bat extension links (126) that is disposed away from said first pivot point (127) on said each of said plurality of bat extension links (126);

a plurality of bats (112), wherein each of said plurality of bats is pivotally coupled to a corresponding one of said plurality of bat extension links (126) at a third pivot point (130) on said bat extension link (126) that is disposed away from the second pivot point (129) and the first pivot point (127), such that each of the plurality of bats pivots with respect to the bat extension link (126);

a plurality of bat cranks (140), wherein each of said plurality of bat cranks (140) is fixed to a corresponding one of said plurality of bats (112) to pivot with said one of said plurality of bats (112) with respect to the bat extension link (126) to which said one of said plurality of bats is pivotally mounted; and a plurality of bat orientation members (142), wherein each of said plurality of bat orientation members (142) is pivotally coupled to a corresponding one of said plurality of bat cranks (140) at a fourth pivot point (131) on the bat crank that is spaced away from the bat (112) to which said one of said plurality of bat cranks (140) is fixed, and wherein each of said plurality of bat orientation members (142) is also pivotally coupled to said wheel (108).

2. The reel of claim 1, wherein each of the plurality of bat extension links (126) are coupled to the wheel (108) at the first point (127) that is between the second pivot point (129) and the third pivot point (130).

3. The reel of claim 1, wherein the plurality of bat extension links (126) pivot with respect to the wheel (108) during one full revolution of the wheel (108) such that each of the plurality of bats (112) is closer to the first rotational axis (115) than the first pivot point (127) at a first rotational position of wheel (108) and each of the plurality of bats (112) is farther from the first rotational axis (115) than the first pivot point (127) at a second rotational position of wheel (108).

4. The reel of claim 1, wherein each of the plurality of bat orientation members (142) is coupled to the wheel (108) at a fifth pivot point (133) that is closer to the first rotational axis (115) than the fourth pivot point (131) over an entire revolution of the wheel (108).

5. The reel of claim 1, wherein the second rotational axis (120) is disposed behind the first rotational axis (115) when the reel (100) is in a harvesting position.

6. The reel of claim 1, wherein the second rotational axis (120) is disposed above the first rotational axis (115) when the reel (100) is in a harvesting position.

7. A reel (100) for engaging and guiding crop plants into an agricultural harvesting head, the reel (100) comprising:

a reel mount (106) configured to be mounted on an agricultural harvester;

a wheel (108) supported for rotation on the reel mount (104) about a first rotational axis (115) with respect to reel mount (104);

an eccentric wheel (118) supported for rotation on the reel mount (104) about a second rotational axis (120), wherein the eccentric wheel comprises a hub (122) and a plurality of arms (125) that are pivotally coupled to the hub (126);

a plurality of bat extension links (126), wherein said plurality of bat extension links (126) are pivotally coupled to the wheel (108) at a plurality of corresponding first pivot points (127) to pivot with respect to the wheel (108), and further wherein each of said plurality of bat extension links (126) is pivotally coupled to a corresponding one of said plurality of arms (125) at a second pivot point (129) on said each of said plurality of bat extension links (126);

a plurality of bats (112), wherein each of said plurality of bats is pivotally coupled to a corresponding one of said plurality of bat extension links (126) at a third pivot point (130) on said bat extension link (126), such that each of the plurality of bats is pivotable with respect to the bat extension link (126);

a plurality of bat cranks (140), wherein each of said plurality of bat cranks (140) is fixed to a corresponding one of said plurality of bats (112) to pivot with said one of said plurality of bats (112); and a plurality of bat orientation members (142), wherein each of said plurality of bat orientation members (142) is pivotally coupled to a corresponding one of said plurality of bat cranks (140) at a fourth pivot point (131) on the bat crank, and wherein each of said plurality of bat orientation members (142) is also pivotally coupled to said wheel (108).

8. The reel of claim 7, wherein each of the plurality of bat extension links (126) are coupled to the wheel (108) at the first point (127) that is between the second pivot point (129) and the third pivot point (130).

9. The reel of claim 7, wherein the plurality of bat extension links (126) pivot with respect to the wheel (108) such that each of the plurality of bats (112) is closer to the first rotational axis (115) than the first pivot point (127) at a first rotational position of wheel (108) and each of the plurality of bats (112) is farther from the first rotational axis (115) than the first pivot point (127) at a second rotational position of wheel (108).

10. The reel of claim 7, wherein each of the plurality of bat orientation members (142) is coupled to the wheel (108) at a fifth pivot point (133) that is closer to the first rotational axis (115) than the fourth pivot point (131) over an entire revolution of the wheel (108).

11. The reel of claim 7, wherein the second rotational axis (120) is disposed behind the first rotational axis (115) when the reel (100) is in a harvesting position.

12. The reel of claim 7, wherein the second rotational axis (120) is disposed above the first rotational axis (115) when the reel (100) is in a harvesting position.

* * * * *